United States Patent [19]

Ullman et al.

[11] Patent Number: 5,426,332
[45] Date of Patent: Jun. 20, 1995

[54] TIDAL GENERATOR

[75] Inventors: Peter W. Ullman, Branford; Daniel P. Lathrop, East Norwalk, both of Conn.

[73] Assignee: Tidal Electric, Inc., Branford, Conn.

[21] Appl. No.: 209,870

[22] Filed: Mar. 11, 1994

[51] Int. Cl.⁶ .................................... F03B 13/12
[52] U.S. Cl. ............................ 290/53; 60/496; 290/40; 290/42; 417/330; 417/334
[58] Field of Search ........... 60/496; 290/4 D, 42, 290/53; 417/330, 334

[56] References Cited

U.S. PATENT DOCUMENTS

| | | | |
|---|---|---|---|
| 418,705 | 1/1890 | Early | 417/330 |
| 696,982 | 4/1902 | Lauten | 417/330 |
| 738,996 | 9/1903 | Hagen | 417/332 |
| 925,581 | 6/1909 | Kendall | 60/496 |
| 975,157 | 11/1910 | Quedens | 290/42 |
| 1,665,140 | 4/1928 | Master | 290/53 |
| 1,818,066 | 8/1931 | Jouy | 60/498 |
| 2,668,918 | 2/1954 | Howell | 290/53 |
| 2,715,366 | 8/1955 | Varziainen | 290/53 |
| 2,820,148 | 1/1958 | Southwick | 290/4 D |
| 3,353,787 | 11/1967 | Semo | 417/330 |
| 3,598,505 | 8/1971 | Greene et al. | 417/220 |
| 3,668,412 | 6/1972 | Vrana et al. | 290/53 |
| 3,758,788 | 9/1973 | Richeson | 290/42 |
| 3,912,938 | 10/1975 | Filipenco | 290/53 |
| 3,993,913 | 11/1976 | Dickman | 290/53 |
| 3,994,134 | 11/1976 | Molnar | 290/53 |
| 4,001,597 | 1/1977 | Graff | 290/53 |
| 4,039,847 | 8/1977 | Diggs | 290/42 |
| 4,164,383 | 8/1979 | French | 290/53 |
| 4,185,464 | 1/1980 | Rainey | 60/496 |
| 4,207,741 | 6/1980 | Rainey | 60/496 |
| 4,208,878 | 6/1980 | Rainey | 290/53 |
| 4,249,085 | 2/1981 | Kertzman | 290/53 |
| 4,261,171 | 4/1981 | Atencio | 290/53 |
| 4,274,008 | 6/1981 | Feltenberger | 290/42 |
| 4,284,901 | 8/1981 | Giguere | 290/53 |
| 4,288,985 | 9/1981 | Dyck | 290/53 |
| 4,369,375 | 1/1983 | Romano | 290/53 |
| 4,375,151 | 3/1983 | French | 290/53 |
| 4,544,849 | 10/1985 | Choi | 290/53 |
| 4,859,866 | 8/1989 | Horne et al. | 290/53 |

OTHER PUBLICATIONS

Stewart, Basic Units in Physics, '49, pp. 7–10, 12.

*Primary Examiner*—A. D. Pellinen
*Assistant Examiner*—Robert Lloyd Hoover
*Attorney, Agent, or Firm*—Fish & Neave; Thomas L. Secrest; Christopher J. Harnett

[57] ABSTRACT

An electric power generator apparatus that generates electrical power from the tidal movements of a body of water by employing multiple energy producing systems. Those energy producing systems include: (1) a moveable tank system associated with hydraulic cylinders in which the upward and downward movements of the tank relative to the tide are used to generate electrical power; (2) an enclosure system in which the controlled inflow and outflow of water between the enclosure and the surrounding body of water is used to generate electrical power; (3) a bellows system in which the effects of the tidal movements are used to force water from the bellows tank through a generator thereby producing electrical power; and (4) a buoyant mass-actuated piston system in which the movement of floating objects (such as docked ships) relative to the tide is used to generate electrical power.

16 Claims, 6 Drawing Sheets

TIDAL GENERATOR

BACKGROUND OF THE INVENTION

During the past three decades, the cost of fossil fuels has increased dramatically. Moreover, in recent years, scientists have begun to recognize the environmentally detrimental effects of hydrocarbon emissions associated with the use of fossil fuels. These factors have lead to increased interest in renewable and environmentally safe forms of energy production including photoelectricity, solar thermal energy, geothermal energy, wind power and hydroelectricity.

Hydroelectric power has been the most widely exploited form of "alternate" energy production. Tides have been harnessed to generate power for hundreds of years. For example, tidal mills on the Danube river date back to the twelfth century. More recently, energy technologists have employed various tidal power station designs to generate and store electrical energy. Many of these designs have been problematic because of adverse effects on the environment such as flooding and changing the tidal regime, which leads to disruption of fragile seashore and estuary ecosystems. [See, e.g., F. O'Kelly, "Harnessing the Ocean's Energy: Are We Ready for a Gift from the Sea?, *Hydro-Review*, Vol. X, No. 4, Jul. 1991]. Many designs are not amenable to large-scale deployment and, therefore, cannot produce commercially meaningful quantities of electrical energy in a cost effective manner. Moreover, many proposed tidal power station designs rely on a single mechanism for generating energy, which may result in energy production that is out of phase with consumer demands as well as dramatic reduction of energy output under certain weather conditions or if repairs to the station are required. [See, e.g., Kertzman, U.S. Pat. No. 4,249,085].

It would therefore be desirable to provide an apparatus for generating electrical energy from the tidal movements of a body of water that is not limited to a narrow range of feasible installation sites and that is well-suited for deployment in many different locations because it will not effect fragile seashore and estuary ecosystems.

It would also be desirable to provide an apparatus for generating electrical energy from the tidal movements of a body of water that does not flood surrounding lands or markedly change the tidal regime.

It would also be desirable to provide an apparatus for generating electrical energy from the tidal movements of a body of water that is amenable to large-scale deployment and that produces significant quantities of electrical energy.

It would also be desirable to provide an apparatus for generating electrical energy from the tidal movements of a body of water that can produce energy over the entire 12 hour and 25 minute tidal cycle.

It would also be desirable to provide an apparatus for generating electrical energy from the tidal movements of a body of water that employs multiple interactive mechanisms that optimize the quantity of electrical energy production.

It would also be desireable to provide an apparatus for generating electrical energy from the tidal movements of a body of water that may be installed in segments.

SUMMARY OF THE INVENTION

It is an object of this invention to provide an apparatus for generating electrical energy from the tidal movements of a body of water that is not limited to a narrow range of feasible installation sites and that is well-suited for deployment in many different locations because it will not effect fragile seashore and estuary ecosystems.

It is also an object of this invention to provide an apparatus for generating electrical energy from the tidal movements of a body of water that does not flood surrounding lands or markedly change the tidal regime.

It is also an object of this invention to provide an apparatus for generating electrical energy from the tidal movements of a body of water that is amenable to large-scale deployment and that produces significant quantities of electrical energy.

It is also an object of this invention to provide an apparatus for generating electrical energy from the tidal movements of a body of water that can produce energy over the entire 12 hour and 25 minute tidal cycle.

It is also an object of this invention to provide an apparatus for generating electrical energy from the tidal movements of a body of water that employs multiple interactive mechanisms that optimize the quantity of electrical energy production.

It is also an object of this invention to provide an apparatus for generating electrical energy from the tidal movements of a body of water that may be installed in segments.

In accordance with the foregoing objects of the present invention, we provide an apparatus for generating electrical energy from the tidal movements of a body of water. The present invention comprises a tidal electric power generator that employs multiple interactive energy producing systems that cooperate to enhance the overall output and reliability of the generator. Those energy producing systems include: (1) a moveable tank system associated with hydraulic cylinders in which the upward and downward movements of the tank relative to the tide are used to generate electrical power; (2) an enclosure system in which the controlled inflow and outflow of water between the enclosure and the surrounding body of water is used to generate electrical power; (3) a bellows system in which the effects of the tidal movements are used to force water from a bellows tank through a generator thereby producing electrical power; and (4) a buoyant mass-actuated piston system in which the movement of floating objects (such as docked ships) relative to the tide is used to generate electrical power. The use of these multiple interactive energy producing systems maximizes the electrical power output of the tidal generator relative to the area that the generator occupies.

BRIEF DESCRIPTION OF THE DRAWINGS

The above-cited and other objects and advantages of the present invention will be apparent upon consideration of the following detailed description, taken in conjunction with the accompanying drawings, in which reference characters consistently refer to the same elements, and in which.

DETAILED DESCRIPTION OF THE INVENTION

Figure 1:
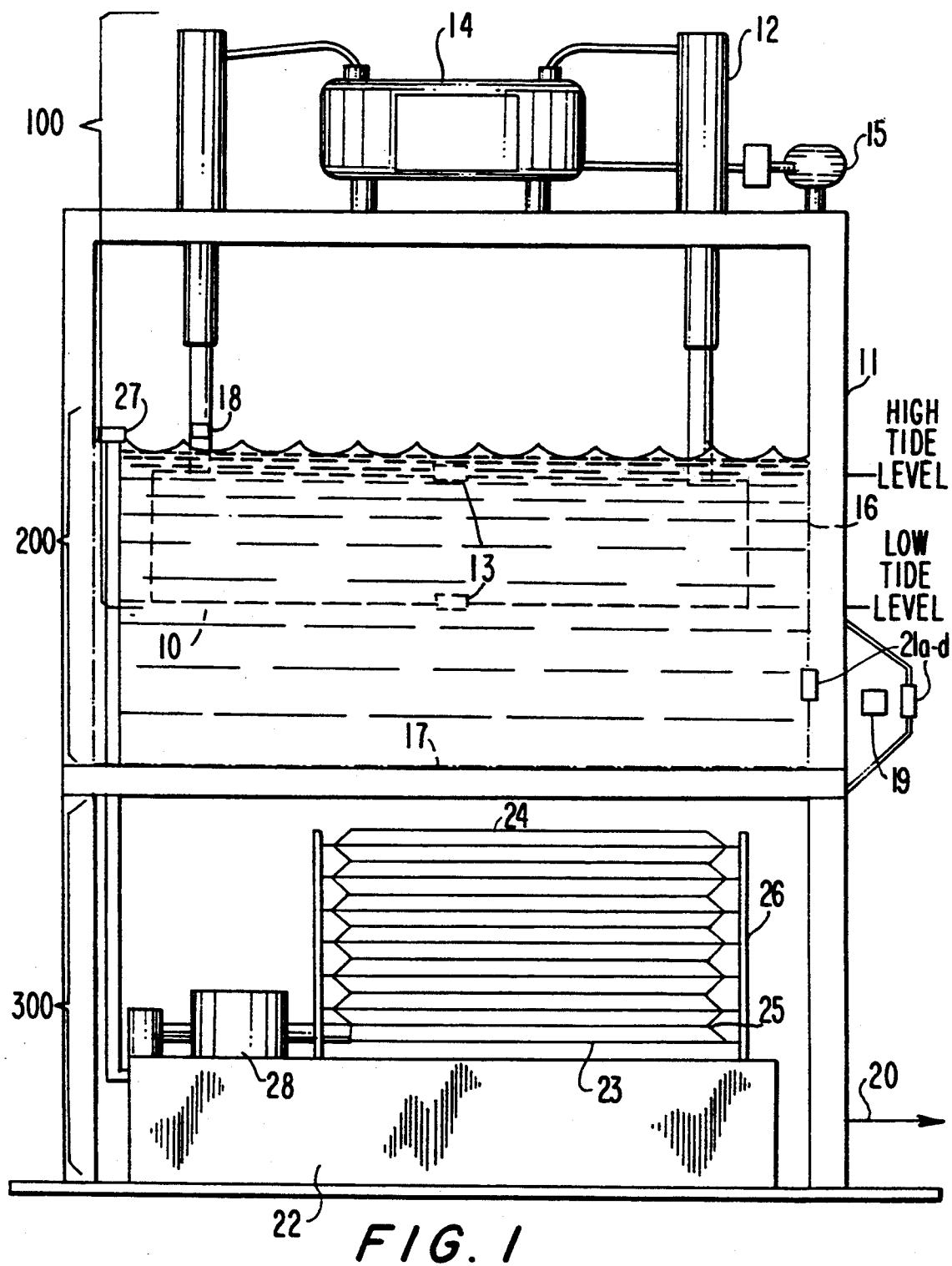
FIG. 1 is a schematic view of one embodiment of the present invention in which an enclosure system, a moveable tank system and a bellows system are employed to generate electrical energy.

The tidal power generator of the present invention includes three primary systems for producing electrical energy: (1) the moveable tank system 100; (2) the enclosure system 200; and (3) the bellows system 300. The moveable tank system 100 includes a hollow tank 10 that is suspended in a rigid support structure 11. The tank 10 is attached to the rigid support structure 11 using one or more telescoping hydraulic cylinders 12. The top and the bottom of the tank 10 are equipped with a series of valves 13 that allow for controlled flow of water and air into and out of the tank 10.

In operation, the telescoping hydraulic cylinders 12 permit controlled vertical movement of the tank 10 within the rigid support structure 11, and may lock the tank 10 in place at a predetermined location relative to the tide level. Preferably, the height of the tank 10 is approximately equal to the maximum tidal range (i.e, the maximum differential between the extreme high tide and the extreme low tide levels) and the rigid support structure 11 is at least three times the height of the maximum tidal range. Thus, the tank 10 may travel so, at one time, its bottom rests just below the high tide mark, and at another time, the top of the tank 10 is submerged just below the low tide mark.

Electrical energy is generated by the movement of the tank 10 during both the rising and the lowering of the tide as follows. The tank 10 is initially empty and sits above the high tide level. As the high tide approaches, valves 13 located in the top and bottom of the tank 10, are opened and the tank 10 is allowed to settle into the water. As water flows into the tank 10, the tank 10 submerges until the top of the tank 10 is substantially flush with the high tide level. The valves 13 are then closed and the telescoping hydraulic cylinders 12 lock the tank 10 at this position. One skilled in the art will recognize that the hydraulic cylinders 12 may be locked into position using any type of locking mechanism 18 including manually operated, computer-controlled or automatic resistance mechanisms that arrest movement of the tank at a desired point relative to the tide level. As the high tide recedes to low tide, the tank 10 remains filled with water and is suspended above the low tide level. The weight of the water in the tank 10 exerts a large downward force and causes the hydraulic fluid within the cylinders 12 to be subject to high-pressure conditions.

At approximately the time of low tide, the hydraulic cylinders 12 are unlocked and the tank 10 is allowed to settle into the water to a level at which the top of the tank 10 is substantially flush with the low tide level. As the tank is lowered into the water, the hydraulic cylinders 12 deliver high-pressure hydraulic fluid to be stored in one or more hydraulic accumulators 14. That fluid is subsequently delivered gradually through a turbine generator 15 whereby electrical energy is produced. The operation of the accumulator 14 and the generator 15 are detailed below.

The valves 13 are next opened and a small amount of stored hydraulic energy is expended to lift the tank 10 out of the water as the water gradually drains out of the tank 10. When the tank 10 is substantially drained and positioned with its bottom substantially flush with the low tide level of the water, the valves 13 are closed and the hydraulic cylinders 12 are again locked to maintain the tank 10 in this position.

As the tide rises, the substantially empty tank 10 exerts a large upward force due to buoyancy. At approximately the high tide, the tank 10 is allowed to rise out of the water with the hydraulic cylinders 12 controlling its rate of ascent. During this ascent the hydraulic cylinders 12 gather high-pressure hydraulic fluid for storage and later conversion to electrical energy. The tank 10 is then locked into position with its bottom just below the high tide level, thus completing one cycle of tidal rising and lowering.

One skilled in the art will recognize that several types of hydraulic accumulators may be used with the present invention. For example, the hydraulic accumulator 14 may be the type that employs compressed air or the type that uses a cylinder with a large weight for maintaining pressure during storage. Similarly, several types of turbines may be employed with the present invention. The turbines may be, for example, gear pump-type turbines or design impulse-type turbines in which multiple buckets catch the hydraulic fluid as it is released from nozzles associated with the accumulator. Electrical power generated by the turbines is transported to land utilities via cable 20 along the floor of the body of water.

The moveable tank system 100 allows for gradual delivery of stored hydraulic pressure fluid from accumulators 14 through turbine generators 15. Thus, electrical power may be produced continuously or on demand over the 12 hour and 25 minute tidal cycle, depending on consumer requirements.

It will be readily apparent to the skilled worker that one large tank or several smaller tanks may be employed in the moveable tank system 100. In some applications, the use of several smaller tanks may be preferable because water can be released from the tanks sequentially or in groups, thereby enhancing control over the amount of water released at any given time.

The enclosure system 200 includes a barrier that is formed by substantially vertical walls 16. The vertical walls 16 extend above the extreme high tide level and below the extreme low tide level. The enclosure system 200 also includes a solid, substantially horizontal bottom 17 that is joined to the vertical walls 16 below the extreme low tide level. The vertical walls 16 and horizontal bottom 17 are formed from a durable material such as structural concrete and are firmly rooted in the floor of the ocean (or other body of water in which the present invention is deployed).

The vertical walls 10 and horizontal bottom 17 form a large basin within which water is allowed to flow to and from the surrounding ocean through a series of electrical energy-generating turbines 19. The turbines 19 are associated with openings in the vertical walls 16. Those openings direct water moving into the basin from the surrounding body of water and water moving out of the basin to the surrounding body of water through the turbines 19. Such "double action" water flow is accomplished by: (1) placing the turbines 19 longitudinally inside the wall 16 and (2) connecting both the inlet and the outlet of the turbines 19 to two gate valves 21 each. One gate valve opens to the inside of the basin and the other opens to the surrounding body of water.

Figure 1A:
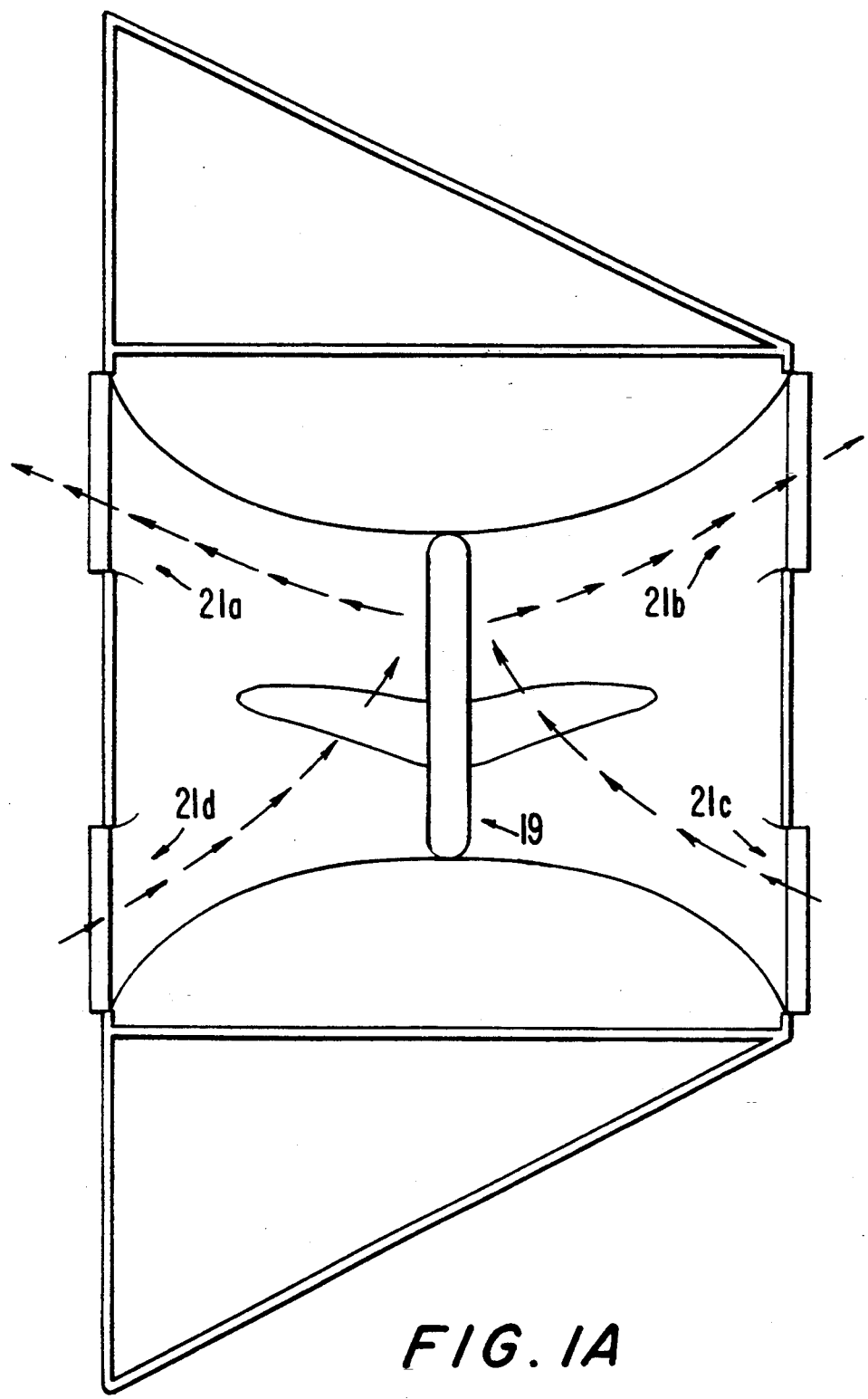
FIG. 1A is a more detailed schematic view of the inlet and outlet valves used with the enclosure system.

In this way (as shown in FIG. 1A), power may be generated during low tide by releasing water through the turbines 19 as the inside inlet valve 21a and the outside outlet valve 21b are opened and water moves from the inside of the basin to the surrounding body of water. At high tide, power may be generated by releasing water through the turbines 19 as the outside inlet valve 21c and the inside outlet valve 21d are opened and water moves into the basin from the outside body of water. Moreover, because the release of water from the basin corresponds to the maximum difference between the high tide and low tide levels (i.e., the "head") the discharge of water has a negligible effect on the tidal regime.

The turbines 19 deployed longitudinally within the walls 16 of the enclosure system 200 may be any of several types of turbines well known to those skilled in the art, including bulb-type axial flow turbines, thru-flow axial flow turbines, and turbines connected to a hydraulic pump. Depending on the type of turbine used, electrical power may be produced directly and transported by cable to land utilities, or high pressure hydraulic fluid may be stored in accumulators prior to conversion.

The bellows system 300 includes a substantially hollow stationary tank 22 that is, preferably, positioned below the horizontal bottom 17 of the enclosure system 200. Also, preferably, the stationary tank 22 is affixed to the floor of the body of water. A bellows tank 23 consisting of a flat lid 24 and compressible and expandable side walls 25 that form a bellows is connected to the top of the stationary tank 22. The bellows tank 23 is equipped with a side support structure 26 to prevent collapse and damage from currents and other phenomena that may cause horizontal movement of the bellows. In the embodiments of the present invention that employ the bellows system 300 in conjunction with the enclosure system 200, the horizontal bottom 17 of the enclosure is adapted with vents that allow water to flow through the bottom 17 of the enclosure. In this way, the bellows system 300 is subject to the higher pressure of high tide and reduced pressure of low tide.

In alternate embodiments of the present invention, the bottom 17 of the enclosure may be contiguous with the floor of the body of water, or may be the floor itself. In such embodiments, the bellows system 300 is affixed to (and above) the bottom of the enclosure, where it is subject to the higher pressure of high tide and the reduced pressure of low tide.

The volume of the bellows tank 23 and the volume of the stationary tank 22 are approximately equal. No part of either the bellows tank 23 or stationary tank 22 extends above the low tide level. An air inlet 27 extends from the stationary tank 22 to a point above the surface of the water. The air inlet 27 provides the stationary tank with an air supply and maintains that air substantially at atmospheric pressure.

In operation, the bellows tank 23 is initially filled with water. At high tide the bellows is substantially deflated and emptied of water. Upon deflation, a valve positioned in an opening that connects the stationary tank 22 to the bellows tank 23 is opened and the water initially kept within the bellows tank 23 moves into the stationary tank 22. As the water flows from the bellows tank 23 into the stationary tank 22 it passes through a turbine generator 28 thereby producing electrical energy.

At low tide, the water in the stationary tank 22 is pumped back into the bellows tank 23. A portion of the energy produced during the deflation of the bellows is used for this reinflation. There is, however, a net energy gain because reinflation is accomplished at low tide. Typically, electrical power is produced directly by the turbine generator 28 as the bellows tank is deflated, and that power is transported by cable 20 to land utilities.

It will be readily apparent to the skilled worker that one large bellows tank 23 and stationary tank 22 arrangement or several smaller arrangements may be employed in the bellows system 300. In some applications, the use of several smaller bellows/stationary tanks may be preferable because smaller bellows are easier to maintain and are less prone to damage.

The present invention employs interactive electrical energy producing systems—the moveable tank system 100, the enclosure system 200 and the bellows system 300—that cooperate to enhance the overall output of the present invention. The use of multiple systems increases the reliability of the tidal generator. For example, even if storm conditions or high winds interfered with the operation of the moveable tank system 100, the enclosure system 200 and the bellows system 300 would continue to produce electrical power. Moreover, the use of multiple systems insures energy production when repairs to one of the systems are required and allows for installation of the power station in segments.

The present invention is amenable to large scale deployment and production of significant quantities of electrical energy. Preferably, the basin formed by the vertical walls 16 and the horizontal bottom 17 of the enclosure system has a horizontal surface area of at least 4,000 m$^2$. Preferably, the total horizontal surface area of the one or more moveable tanks is at least 3,000 m$^2$ and the total horizontal surface area of the lid portion of the one or more bellows tanks is also at least 3,000 m$^2$. The large basin size accommodates the upward and downward movement of the one or more large moveable tanks into and out of the water within the basin. While it is preferable to deploy the moveable tank(s) so that they travel vertically within the area defined by the vertical walls of the enclosure, it may also be advantageous under some circumstances to deploy the moveable tanks around the outer perimeter of the enclosure.

Preferably, the bottom of the enclosure is large enough to accommodate the bellows/stationary tank(s) completely beneath it. This would minimize the environmental impact of the tidal generator, reduce wear and tear on the bellows and facilitate repairs to the bellows. The same benefits will accrue in the embodiments of this invention where the bottom 17 of the enclosure is contiguous with the floor of the body of water (or is the floor itself), as the vertical walls 16 of the enclosure can be constructed to completely surround the bellows system 300.

Preferably, the tidal electric power generator of the present invention is deployed in an ocean environment in which there is a large difference between the high tide and the low tide levels. Large tide differential will enhance the output of the tidal generator. The large-scale and sturdy design of the present invention makes it suitable for deployment a significant distance off shore where it will not interfere with delicate shoreline ecosystems. The tidal generator of the present system may also be deployed in certain river, bay, sea, estuary or lake environments.

Figure 2:
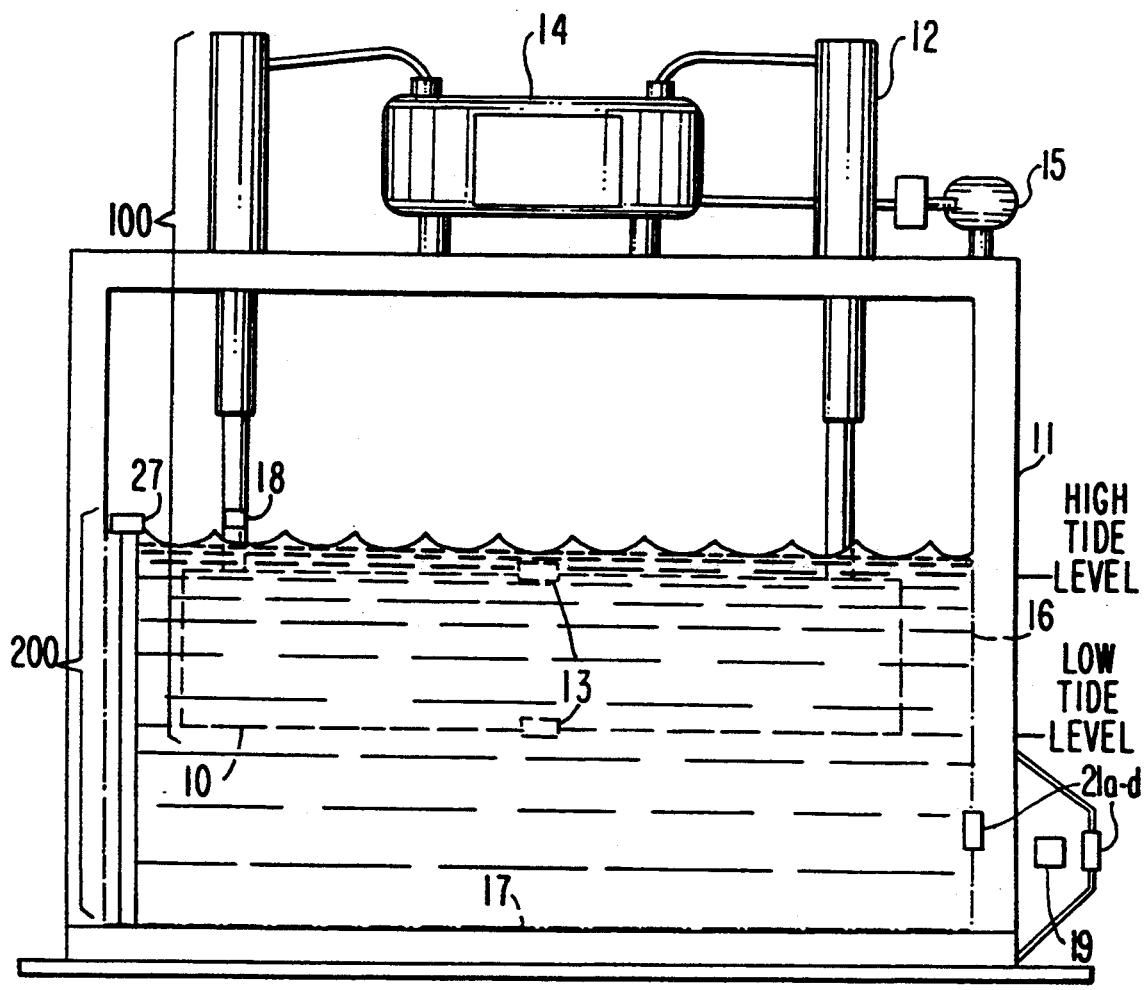
FIG. 2 is a schematic view of another embodiment of the present invention in which an enclosure system and a moveable tank system are employed to generate electrical energy.

The embodiment of the present invention shown in FIG. 1 may be modified to include additional or fewer energy producing systems depending on economic, environmental or other considerations. For example, FIG. 2 shows an embodiment of the present invention comprising the moveable tank system 100 and enclosure system 200. This embodiment may be preferable where it is impractical to deploy a bellows system 300 or to support the bottom of the enclosure system above the floor of the body of water.

Figure 3:
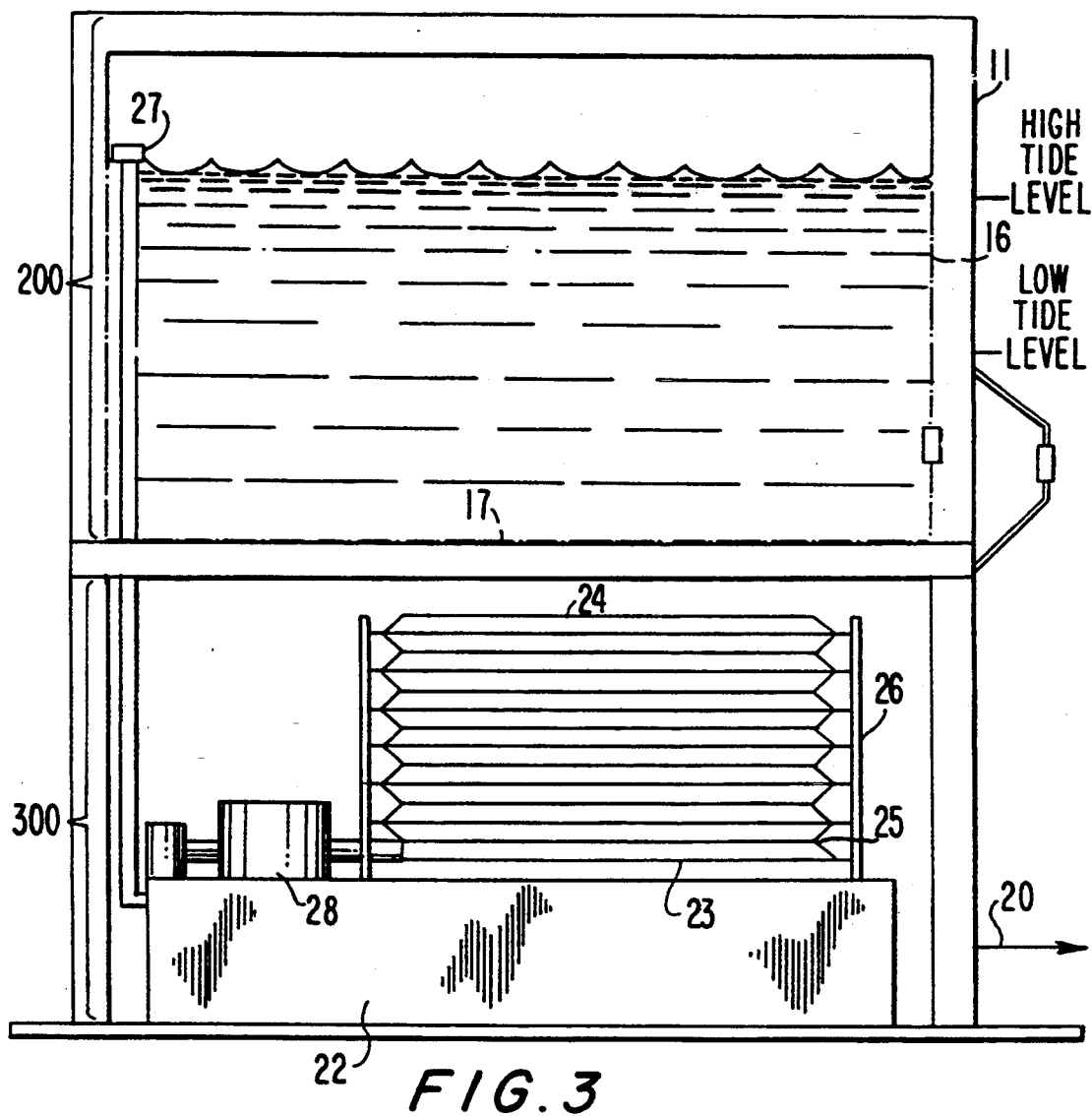
FIG. 3 is a schematic view of another embodiment of the present invention in which an enclosure system and a bellows system are employed to generate electrical energy.

FIG. 3 shows another embodiment of the present invention comprising the enclosure system 200 and the bellows system 300. This embodiment may be preferable in environments where it is desireable to limit the height of the tidal generator.

Figure 4:
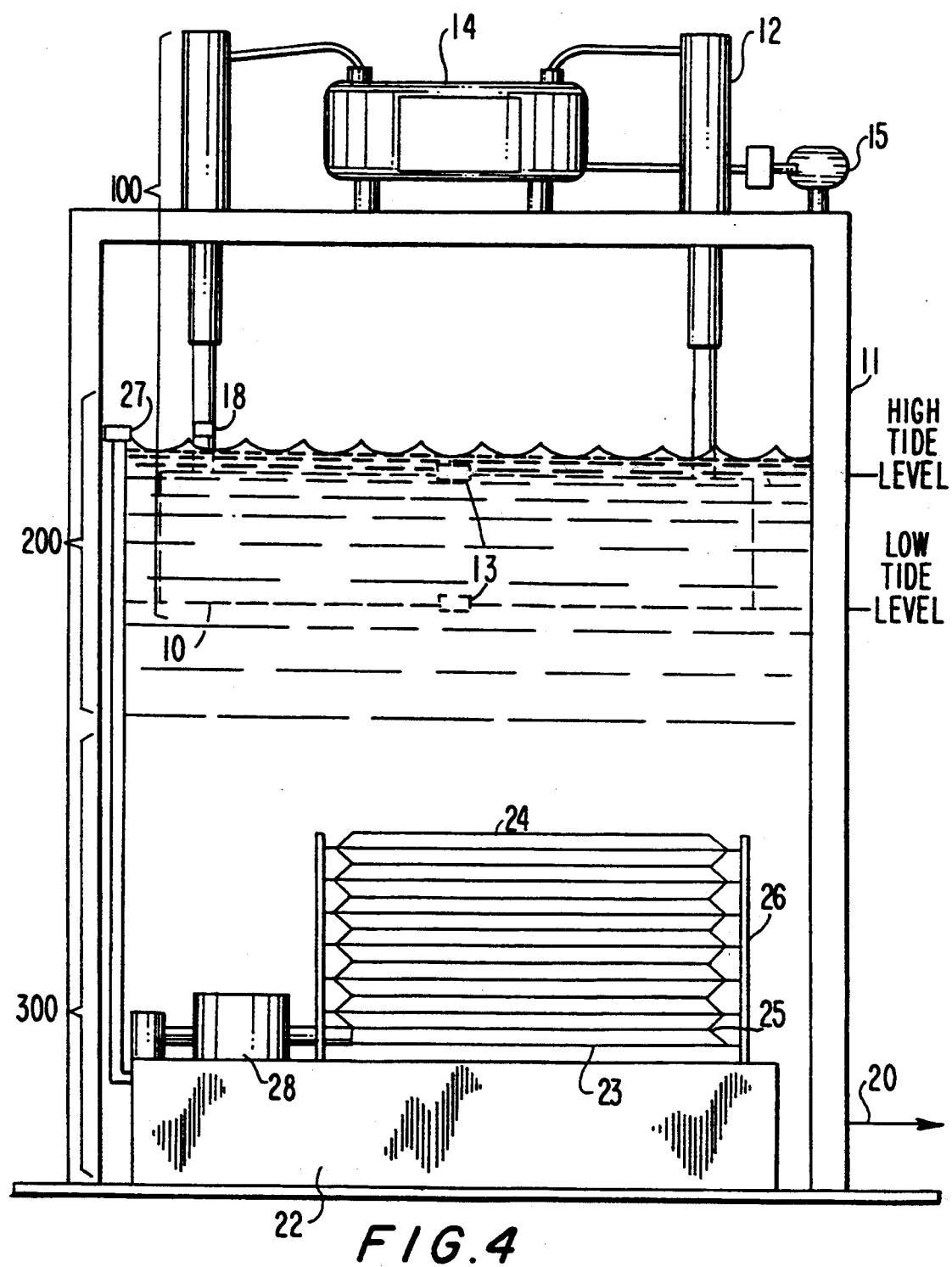
FIG. 4 is a schematic view of another embodiment of the present invention in which a moveable tank system and a bellows system are employed to generate electrical energy.

FIG. 4 shows another embodiment of the present invention comprising the moveable tank system 100 and the bellows system 300. This embodiment may be preferable for deployment in environments where construction of the enclosure system 200 would unduly interfere with the flow of the surrounding body of water.

Figure 5:
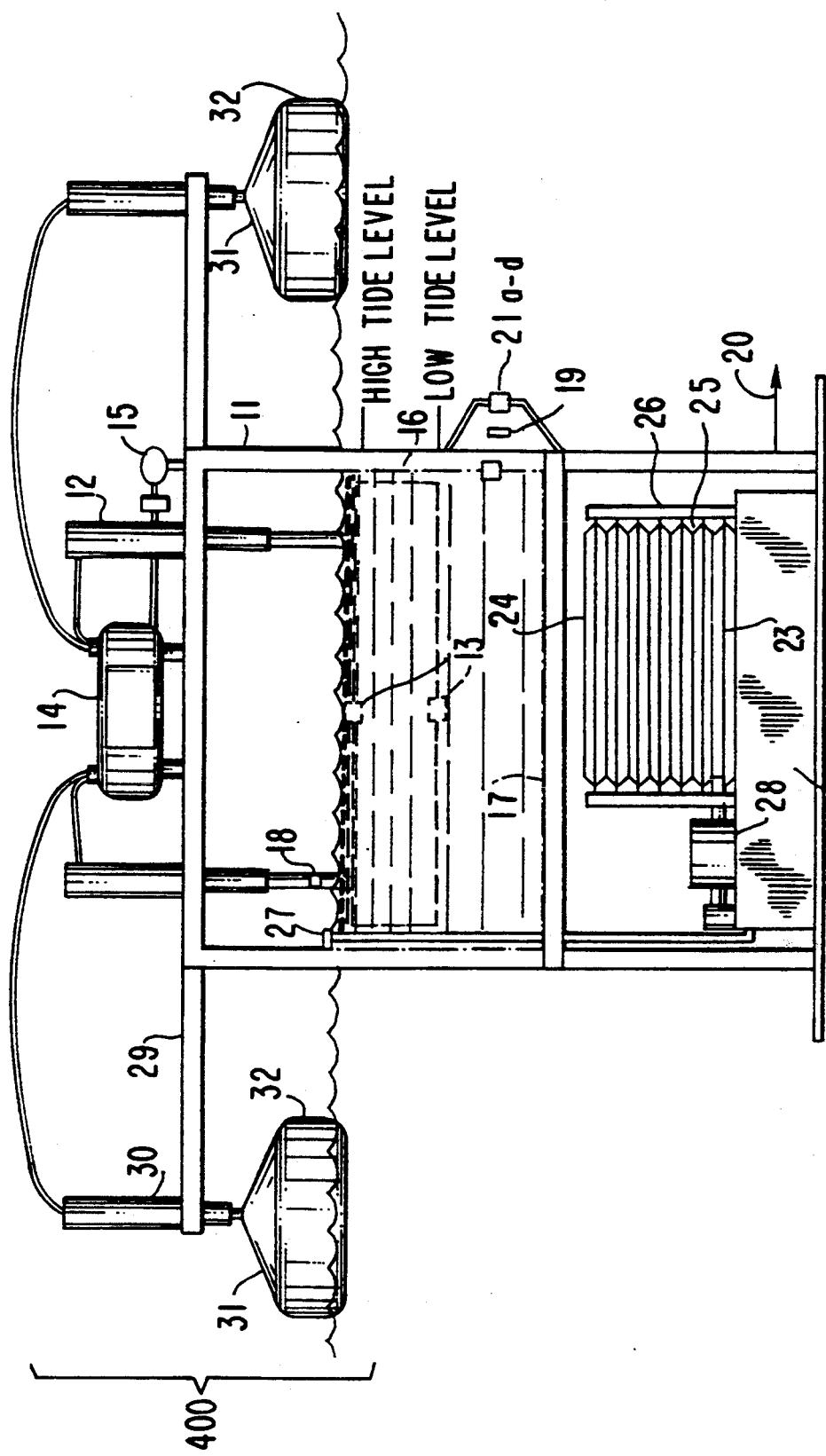
FIG. 5 is a schematic view of a buoyant mass-actuated piston system that may be used in conjunction with the apparatus shown in FIGS. 1-4 to generate electrical energy.

FIG. 5 shows a buoyant mass-actuated piston energy producing system 400 that may be used in conjunction with any of the embodiments of the present invention shown in FIGS. 1–4. The buoyant mass-actuated piston system includes a support arm 29 that may be affixed to and horizontally extend from the rigid support structure 11 of the moveable tank system 100 or the top of the vertical walls 16 of the enclosure system 200. The support arm 29 is connected to a hydraulic cylinder 30 similar to that used with the moveable tank system 100. A sling 31 capable of cradling a buoyant object 32 such as a docked ship is attached to the hydraulic cylinder 30.

In operation, the cradled buoyant object 32 is locked into position at high tide and is lowered as the tide approaches its lowest level. The downward force exerted by the object 32 causes the hydraulic fluid in the cylinder 30 to be subject to high-pressure conditions. As the object 32 settles into the low tide level water, the hydraulic cylinder 30 delivers high-pressure hydraulic fluid to accumulators for temporary storage until turbines are used to generate power from the stored hydraulic fluids. The force generated by the upward movement of the buoyant object during rising tides may also be used to pressurize the hydraulic fluid within the cylinder 30 for ultimate conversion to electric power.

The skilled worker will recognize that the buoyant mass-actuated piston system 400 may share accumulators and generators with the moveable tank system, or the buoyant mass-actuated system may be equipped with its own accumulators and generators. Preferably, embodiments of the present invention that incorporate the buoyant mass-actuated piston system 400 will employ multiple units of the system in order to maximize energy production.

The skilled worker will appreciate that the present invention can be practiced by other than the described embodiments, which are presented for purposes of illustration and not of limitation, and the present invention is limited only by the claims that follow.

We claim:

1. An apparatus for generating electrical energy from the tidal movements of a body of water having tides and a floor comprising:

an enclosure securely fixed to the floor of the body of water, the enclosure being formed by substantially vertical walls and a substantially horizontal bottom wherein the walls extend above the extreme high tide level and below the extreme low tide level of the body of water, and the walls are adapted with means for selectively directing water to flow in and out of the enclosure through turbines operatively associated with the walls;

at least one substantially hollow moveable tank adapted with means for selectively allowing water and air to flow in and out of the tank;

a support means including a rigid frame and a hydraulic cylinder operatively associated with the moveable tank to allow for vertical movement of the tank wherein the hydraulic cylinder is in fluid communication with hydraulic fluid that is pressurized in response to the upward and downward vertical movements of the tank;

a means for storing pressurized hydraulic fluid;

a locking means operatively associated with the support means for selectively retaining the tank at specific positions in the vertical plane relative to the tide level of the body of water; and a turbine associated with the means for storing pressurized hydraulic fluid that generates power as the pressurized hydraulic fluid is released into the turbine.

2. An apparatus according to claim 1 wherein no part of the movable tank extends horizontally beyond the walls of the enclosure.

3. An apparatus according to claim 1 further comprising:

at least one stationary tank that is positioned completely below the extreme low tide level of the body of water;

at least one bellows tank including expandable and compressible side walls and a lid positioned atop the stationary tank wherein the lid of the bellows tank does not extend above the extreme low tide level of the body of water;

a means to selectively allow water to travel between the bellows tank and the stationary tank so that the bellows tank is substantially expanded and filled with water at low tide and substantially compressed and empty at high tide and the stationary tank is substantially filled with water at high tide and substantially filled with air at low tide;

a turbine positioned between the bellows tank and the stationary tank that generates power as water is moved from the bellows tank to the stationary tank; and a means for supplying air to the stationary tank so that the pressure of the air maintained within the stationary tank is substantially equal to atmospheric air pressure.

4. An apparatus according to claim 3 wherein no part of the stationary tank or the bellows tank extend horizontally beyond the walls of the enclosure.

5. An apparatus according to claim 3 wherein the surface area of the enclosure is greater than 4,000 m$^2$.

6. An apparatus according to claim 3 wherein the total horizontal surface area of the one or more moveable tanks is greater than 3,000 m$^2$.

7. An apparatus according to claim 3 wherein the volume of the stationary tank and the bellows tank are substantially equal.

8. An apparatus according to claim 3 wherein the total horizontal surface area of the one or more stationary tanks and the total horizontal surface area of the one or more rigid lids of the bellows tanks both are greater than 3,000 m$^2$.

9. An apparatus according to claim 3 wherein the height of the moveable tank is substantially equal to the maximum tidal range.

10. An apparatus for generating electrical energy from the tidal movements of a body of water having tides and a floor comprising:
   an enclosure securely fixed to the floor of the body of water, the enclosure being formed by substantially vertical walls and a substantially horizontal bottom wherein the walls extend above the extreme high tide level and below the extreme low tide level of the body of water, and the walls are adapted with means for selectively directing water to flow in an out of the enclosure through turbines operatively associated with the walls;
   at least one stationary tank that is positioned completely below the extreme low tide level of the body of water;
   at least one bellows tank including expandable and compressible side walls and a lid positioned atop the stationary tank wherein the lid of the bellows tank does not extend above the extreme low tide level of the body of water;
   a means for selectively allowing water to travel between the bellows tank and the stationary tank so that the bellows tank is substantially expanded and filled with water at low tide and substantially compressed and empty at high tide and the stationary tank is substantially filled with water at high tide and substantially filled with air at low tide;
   a turbine positioned between the bellows tank and the stationary tank that generates power as water is moved from the bellows tank to the stationary tank; and
   a means for supplying air to the stationary tank so that the pressure of the air maintained within the stationary tank is substantially equal to atmospheric air pressure.

11. An apparatus according to claim 10 wherein no part of the stationary tank or bellows tank extend horizontally beyond the walls of the enclosure.

12. An apparatus for generating electrical energy from the tidal movements of a body of water having tides and a floor comprising:
   at least one substantially hollow moveable tank adapted with means for selectively allowing water and air to flow in and out of the tank;
   a support means including a rigid frame and a hydraulic cylinder operatively associated with the tank to allow for vertical movement of the tank wherein the hydraulic cylinder is in fluid communication with hydraulic fluid that is pressurized in response to the upward and downward vertical movements of the tank;
   a means for storing pressurized hydraulic fluid;
   a locking means operatively associated with the support means for selectively retaining the tank at specific positions in the vertical plane relative to the tide level of the body of water;
   a turbine associated with the means for storing pressurized hydraulic fluid that generates power as the pressurized hydraulic fluid is released into the turbine;
   at least one stationary tank that is positioned completely below the extreme low tide level of the body of water;
   at least one bellows tank including expandable and compressible side walls and a lid positioned atop the stationary tank wherein the lid of the bellows tank does not extend above the extreme low tide level of the body of water;
   a means for selectively allowing water to travel between the bellows tank and the stationary tank so that the bellows tank is substantially expanded and filled with water at low tide and substantially compressed and empty at high tide and the stationary tank is substantially filled with water at high tide and substantially filled with air at low tide;
   a turbine positioned between the bellows tank and the stationary tank that generates power as water is moved from the bellows tank to the stationary tank; and
   a means for supplying air to the stationary tank so that the pressure of the air maintained within the stationary tank is substantially equal to atmospheric air pressure.

13. An apparatus according to claim 12 wherein no part of the movable tank extends horizontally beyond the rigid frame.

14. An apparatus according to claim 12 wherein no part of the stationary tank or bellows tank extend horizontally beyond the rigid frame.

15. An apparatus according to any one of claims 1, 3 and 12 further comprising:
   one or more means to selectively support a buoyant mass above the level of the body of water including a horizontally extending support arm and a sling that supportably fits around the buoyant mass;
   a means for controllably lowering the suspended buoyant mass into the water including a hydraulic cylinder that is in fluid communication with hydraulic fluid that is pressurized in response downward force exerted by the buoyant mass as it is suspended above and lowered into the water;
   a means for storing the hydraulic fluid that is pressurized in response to the movements of the buoyant mass; and
   a turbine associated with the means for storing the hydraulic fluid that is pressurized in response to the movements of the buoyant mass that generates power as the high pressure hydraulic fluid is released into the turbine.

16. An apparatus according to claim 15 wherein the buoyant mass is a docked ship.

* * * * *